INVENTOR
JOHN J. RAITI

Oct. 20, 1970 — J. J. RAITI — 3,534,534
ROTARY LAWN MOWER BLADE
Filed Oct. 18, 1968 — 2 Sheets-Sheet 2
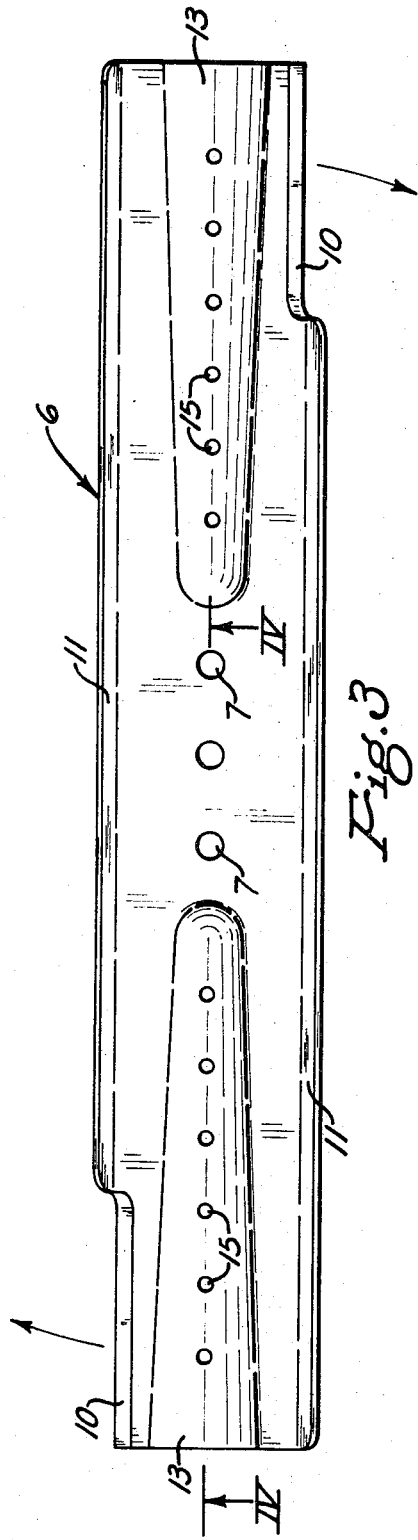
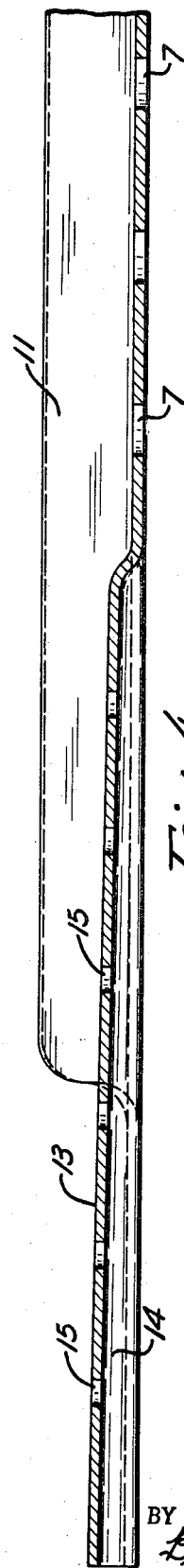
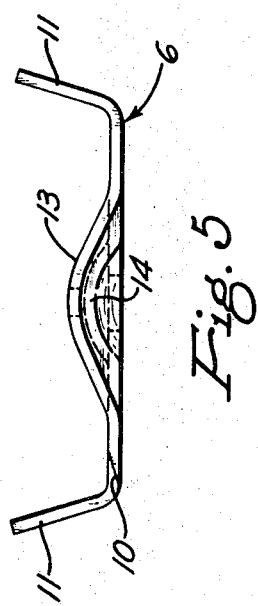
INVENTOR
JOHN J. RAITI
BY
Brown, Critchlow, Flick & Peckham
ATTORNEYS.

United States Patent Office 3,534,534
Patented Oct. 20, 1970

3,534,534
ROTARY LAWN MOWER BLADE
John J. Raiti, Rte. 5, Greenville, Pa. 16125
Filed Oct. 18, 1968, Ser. No. 768,756
Int. Cl. A01d 55/18
U.S. Cl. 56—295                    7 Claims

ABSTRACT OF THE DISCLOSURE

A rotary lawn mower blade has central holes for bolting it in place, and a pair of diagonally opposite cutting edges at the opposite ends. An integral flange extends along each side substantially from its cutting edge to the opposite end of the blade, the two flanges being inclined upwardly away from each other. Also, the blade is bowed upwardly in cross section along its longitudinal axis inwardly from each end to form a pair of ridges along its top with inverted troughs below. The blade is provided with a row of holes through it along the top of each ridge.

---

The conventional rotary lawn mower has a downwardly opening housing, in the center of which a drive shaft is rotated at high speed by a motor, usually gasoline powered. Fastened to this shaft inside the housing is the central portion of a horizontal blade, the leading edges of which are sharpened for cutting the grass as the blade rotates and is moved across the lawn. Such mowers, however, do not operate satisfactorily when the grass is wet, which can be a real objection because the operator of the mower may wish to cut his grass before or after work, and at those times of day the grass may be wet from dew if not from rain. The wet grass tends to lie down so that it is not cut or is cut unevenly. Moreover, cuttings from wet grass accumulate in the top of the mower housing and can pack there to such an extent that they interefere with rotation of the blade. This means that with lawns of large area the mower must be turned on its side periodically and the cuttings cleaned out of the housing.

It is among the objects of this invention to provide a rotary lawn mower blade which lifts the grass as it passes over it, which cuts the grass evenly, which keeps the mower housing substantially free of clippings, and which does not throw stones and other objects out from beneath the mower.

The preferred embodiment of the invention is illustrated in the accompanying drawings, in which FIG. 1 is a fragmentary side view of a rotary lawn mower provided with my blade;

FIG. 3 is an enlarged plan view of the blade;

FIG. 4 is an enlarged longitudinal section taken on the line IV—IV of FIG. 3; and FIG. 5 is an end view of the blade.

Figure 1:
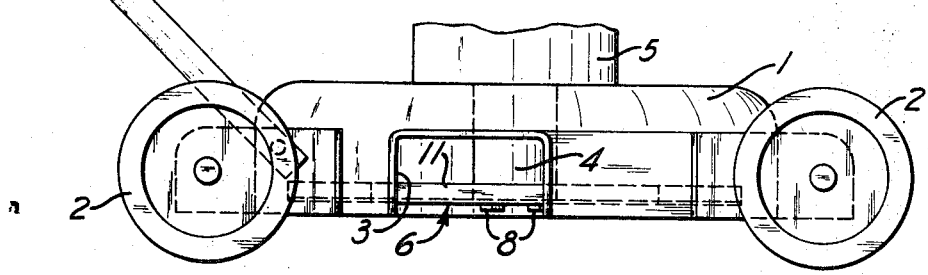
Figure 2:
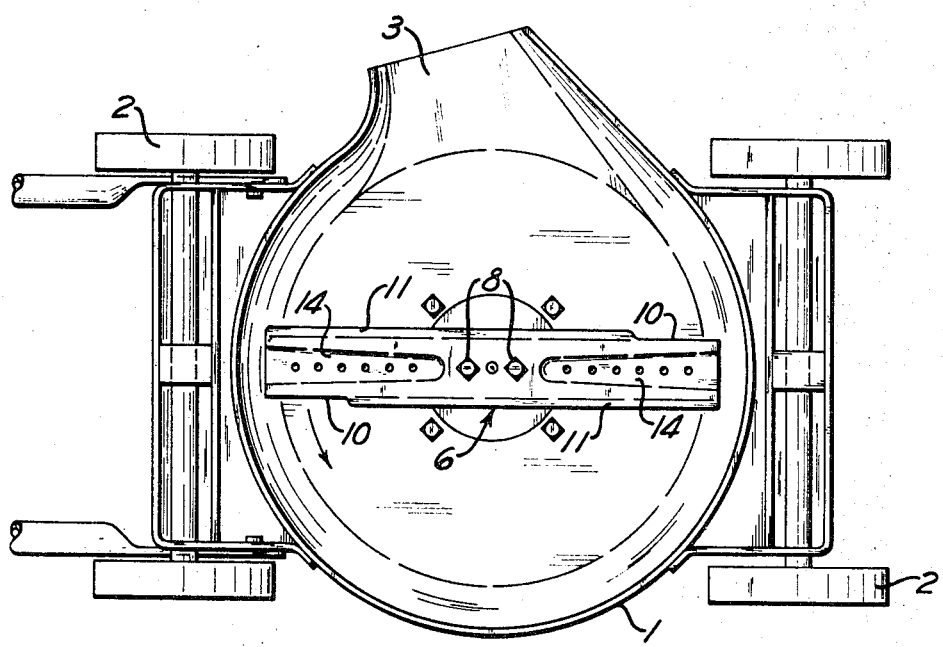
FIG. 2 is a bottom view of the mower.

Referring to FIGS. 1 and 2 of the drawings, a rotary lawn mower of conventional construction is provided with a generally circular housing 1 that is open at its bottom and that is supported a short distance above the ground by wheels 2. The wheels may be motor driven or the mower may be pushed by its handle. The side wall of the housing is cut away at one point to provide an outlet 3 for grass cuttings. Rotatably mounted in the center of the housing is a drive shaft 4 that is driven at high speed by a motor 5 mounted on the housing. Usually the motor is powered by gasoline, although it can be an electric motor. Inside the housing the center of a horizontal motor blade 6 is rigidly mounted on the drive shaft. For this purpose, the central portion of the sheet steel bar from which the blade is made is provided with two or more holes 7 (FIG. 3) that receive bolts 8 which connect the blade to the shaft.

At each end of the blade, its leading edge is sharpened for several inches inwardly from the end to form a cutting edge 10, as shown in FIGS. 2, 3 and 5, the two cutting edges being diagonally opposite each other. Ordinarily, they will not extend more than half way from the ends of the blade to its center and usually somewhat less. Extending from or near the inner end of each cutting edge to the opposite end of the blade, as shown in FIGS. 3 to 5 there is an inclined side flange 11. The two flanges diverge upwardly so that the blade takes the general form of a channel, in which its upwardly bent side flanges are shorter than the channel and are offset longitudinally relative to each other. The width of each flange is less than half the distance across the base of the channel. Although the base of each flange, where it joins the body of the blade, could be closer than the adjoining cutting edge 10 to the longitudinal center line of the blade, it preferably is substantially in line with that cutting edge so that the inclined flanges extend outward beyond the cutting edges as shown in FIG. 5.

While the blade is revolving at high speed, the flanges 11 cause it to ack like a fan blade that blows air upwardly in the housing with such velocity and causes such air turbulence in the upper part of the housing that even wet grass clippings will not accumulate in the housing. In other words, a lawn mower that is provided with this blade is self-cleaning.

Another advantage of flanges 11 is that stones, small sticks, etc. picked up by the blade will be struck by the portions of the flanges behind the cutting edges and thrown against the side wall of the housing or up against the top of the housing, from which they will be deflected downward and thrown through the outlet only a very few feet at ground level. Consequently, this blade is much safer to use than known blades.

Another feature of this invention is that the blade is bowed upwardly in cross section along its longitudinal axis inwardly from each end toward its center to provide a pair of ridges 13 extending along the top of the blade. Preferably the side edges of the ridges are spaced from the opposite sides of the blade by intervening flat areas, as shown in FIG. 5. Although the exact length of each ridge is not criitcal, it has been found that if it extends inwardly nearly to the closest bolt hole 7, excellent results are obtained. This means that the ribs may be about twice as long as cutting edges 10. Beneath the blade, the ridges form inverted troughs 14. Along the top of each ridge the blade has a row of holes 15 through it, the purpose of which is as follows. As the blade rotates in the mower housing, air beneath it is caught in troughs 14 and ejected upwardly through the holes. Also, the air flowing across ridges 13 creates a low pressure area above the holes that draws air up through them. The air current moving upwardly through the mower in this manner draw the grass beneath it upright, even though it is wet, so that it is cut while standing up. The result is that the grass is cut to a uniform height, thereby producing a "crew cut" lawn. During cutting, this blade simultaneously conditions the lawn by distributing the grass cuttings evenly, resulting in the lawn developing a cushion-like texture.

On the other hand, if the grass was so tall that heavy strips of cuttings are left after mowing that might kill the underlying grass, the blade can be removed from the drive shaft and turned bottom side up and reattached to the shaft. Then, the mower is run over the lawn again, and the inverted blade will create a strong down draft of air that will blow the loose cuttings out from beneath the mower housing in all directions and spread them more or less evenly over the lawn. Consequently, it is unnecessary to rake or sweep up the cuttings.

I claim:

1. A rotary lawn mower blade in the form of a horizontal sheet steel bar provided centrally with holes for bolting it to the vertical drive shaft of a mower, the blade having a pair of diagnoally opposite cutting edges extending inwardly along its sides from its opposite ends, each side of the blade being provided with an upturned integral flange extending substantially from its cutting edge to the opposite end of the blade, said flanges being inclined upwardly and away from each other to form a channel-like member having longitudinally offset upwardly diverging side flanges shorter than the blade, the blade being bowed upwardly in cross section along its longitudinal axis inwardly from each end to form a pair of longitudinally spaced ridges along its top and a pair of inverted troughs in its bottom, and the blade being provided with a row of longitudinally spaced air holes therethrough along the top of each of said ridges.

2. A rotary lawn mower blade according to claim 1, in which each flange is straight and the base of each flange is substantially in line with the adjoining cutting edge.

3. A rotary lawn mower blade according to claim 1, in which said ridges are about twice as long as said cutting edges.

4. A rotary lawn mower blade according to claim 1, in which the inner ends of said ridges terminate near said bolt holes.

5. A rotary lawn mower blade according to claim 1, in which each cutting edge extends about half the length of the adjacent ridge, and each flange is straight and its base is substantially in line with the adjoining cutting edge.

6. A rotary lawn mower blade according to claim 1, in which said ridges are tapered toward each other, and the top of each ridge is inclined downwardly from its outer end to its inner end.

7. A rotary lawn mower blade according to claim 1, in which the central portion of said bar and the portions of the bar between said ridges and flanges are substantially flat and horizontal.

References Cited

UNITED STATES PATENTS

| | | | |
|---|---|---|---|
| 2,836,029 | 5/1958 | Johnson | 56—295 |
| 2,854,807 | 10/1958 | Byler et al. | 56—295 |
| 3,395,521 | 8/1968 | Crockett et al. | 56—295 |

RUSSELL R. KINSEY, Primary Examiner

J. N. ESKOVITZ, Assistant Examiner